United States Patent
Wakazono

(10) Patent No.: US 10,091,421 B2
(45) Date of Patent: *Oct. 2, 2018

(54) IMAGING APPARATUS, IMAGING METHOD, AND PROGRAM

(71) Applicant: SONY CORPORATION, Tokyo (JP)

(72) Inventor: Masafumi Wakazono, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/498,752

(22) Filed: Apr. 27, 2017

(65) Prior Publication Data

US 2017/0230579 A1    Aug. 10, 2017

Related U.S. Application Data

(63) Continuation of application No. 14/250,857, filed on Apr. 11, 2014, now Pat. No. 9,661,219.

(30) Foreign Application Priority Data

May 13, 2013  (JP) ................... 2013-101051

(51) Int. Cl.
*H04N 5/232* (2006.01)
*H04N 9/04* (2006.01)

(52) U.S. Cl.
CPC ..... *H04N 5/23245* (2013.01); *H04N 5/23212* (2013.01); *H04N 5/23216* (2013.01); *H04N 5/23219* (2013.01); *H04N 5/23293* (2013.01); *H04N 9/045* (2013.01); *H04N 2209/045* (2013.01)

(58) Field of Classification Search
CPC .......... H04N 5/23241; H04N 5/23212; H04N 5/23245
USPC ...................................................... 348/222.1
See application file for complete search history.

(56) References Cited

U.S. PATENT DOCUMENTS

| | | | |
|---|---|---|---|
| 2002/0113899 | A1 | 8/2002 | Swan |
| 2003/0002870 | A1 | 1/2003 | Baron |
| 2004/0083038 | A1 | 4/2004 | He |
| 2004/0212678 | A1 | 10/2004 | Cooper et al. |

(Continued)

FOREIGN PATENT DOCUMENTS

| | | |
|---|---|---|
| CN | 103024261 A | 4/2013 |
| JP | 2004-128587 | 4/2004 |

(Continued)

OTHER PUBLICATIONS

Japanese Office Action dated Nov. 8, 2016 for Japanese Application 2013-101051.

(Continued)

*Primary Examiner* — Lin Ye
*Assistant Examiner* — Chan T H Nguyen
(74) *Attorney, Agent, or Firm* — Oblon, McClelland, Maier & Neustadt, L.L.P.

(57) ABSTRACT

An image processing system includes circuitry that determine whether a focus operation is performed on an image, and processes the image in a high resolution mode when the focus operation is determined to be performed. The circuitry processes the image in a low resolution mode when the focus operation is determined not to be performed. The resolution of the image is lower in the low resolution mode than in the high resolution mode.

18 Claims, 7 Drawing Sheets

(56) References Cited

U.S. PATENT DOCUMENTS

| | | | |
|---|---|---|---|
| 2008/0136958 A1 | 6/2008 | Nakahara | |
| 2009/0244358 A1* | 10/2009 | Senoo | H04N 5/23212 348/345 |
| 2010/0020222 A1* | 1/2010 | Jones | G06F 3/04883 348/333.02 |
| 2010/0321530 A1 | 12/2010 | Baek | |
| 2012/0172086 A1 | 7/2012 | Choi | |
| 2013/0070145 A1* | 3/2013 | Matsuyama | H04N 5/23216 348/333.12 |
| 2013/0135499 A1* | 5/2013 | Song | H04N 5/232 348/240.99 |
| 2013/0194475 A1* | 8/2013 | Okamoto | H04N 5/23293 348/333.01 |
| 2013/0250145 A1* | 9/2013 | Miura | H04N 5/23212 348/239 |
| 2017/0289442 A1* | 10/2017 | Cho | G03B 13/36 |

FOREIGN PATENT DOCUMENTS

| | | | |
|---|---|---|---|
| JP | 2004-128587 A | 4/2004 | |
| JP | 2005-347847 | * 12/2005 | ............ H04N 5/232 |
| JP | 2007-13926 | 1/2007 | |
| JP | 2007-060328 | 3/2007 | |
| JP | 2009-10616 A | 1/2009 | |

OTHER PUBLICATIONS

Japanese Office Action dated May 16, 2017 in Patent Application No. 2013-101051 (without English Translation).

Combined Chinese Office Action and Search Report dated Feb. 2, 2018 in corresponding Patent Application No. 201410187190.2 (with English Translation), 25 pages.

* cited by examiner

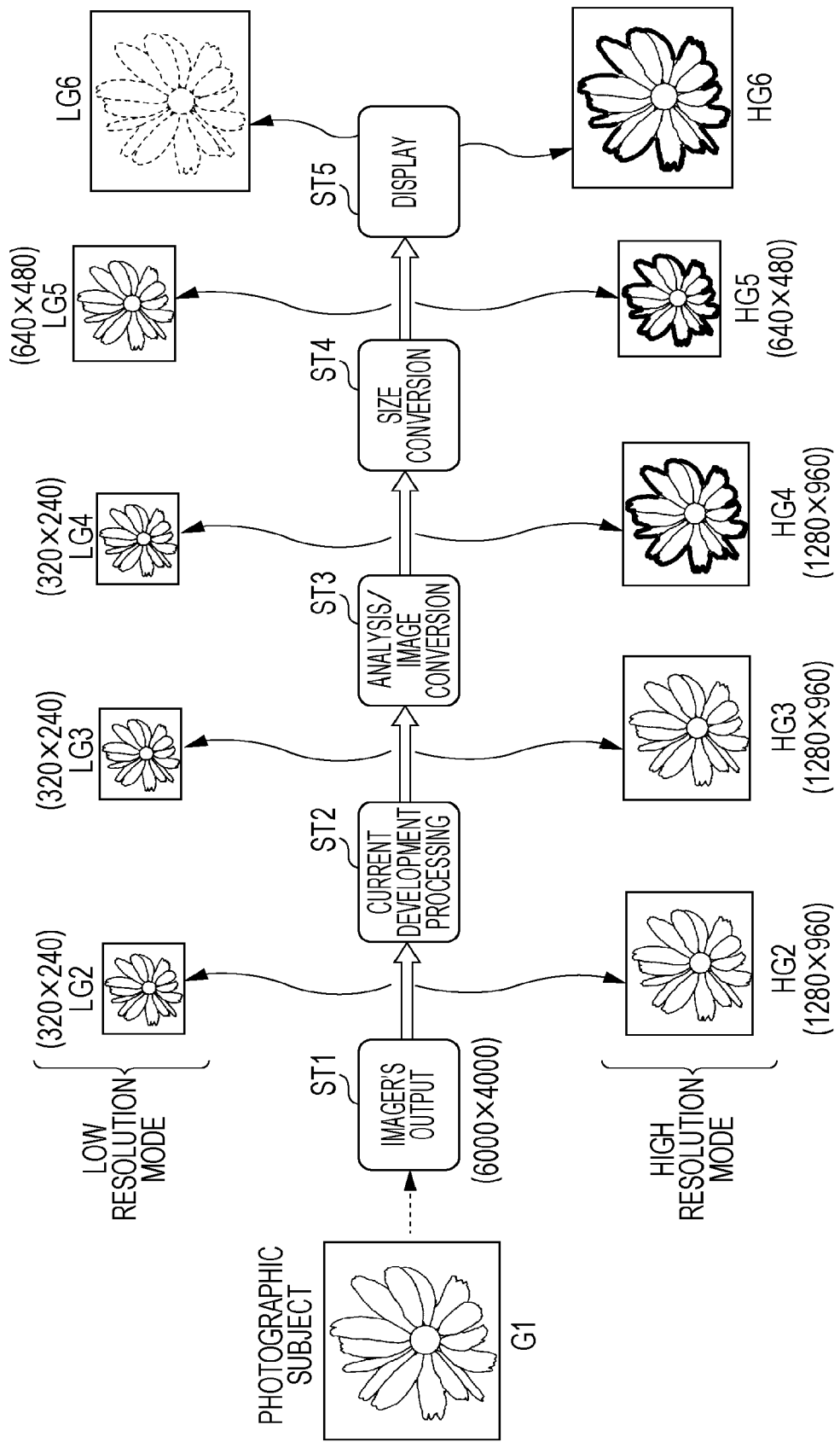

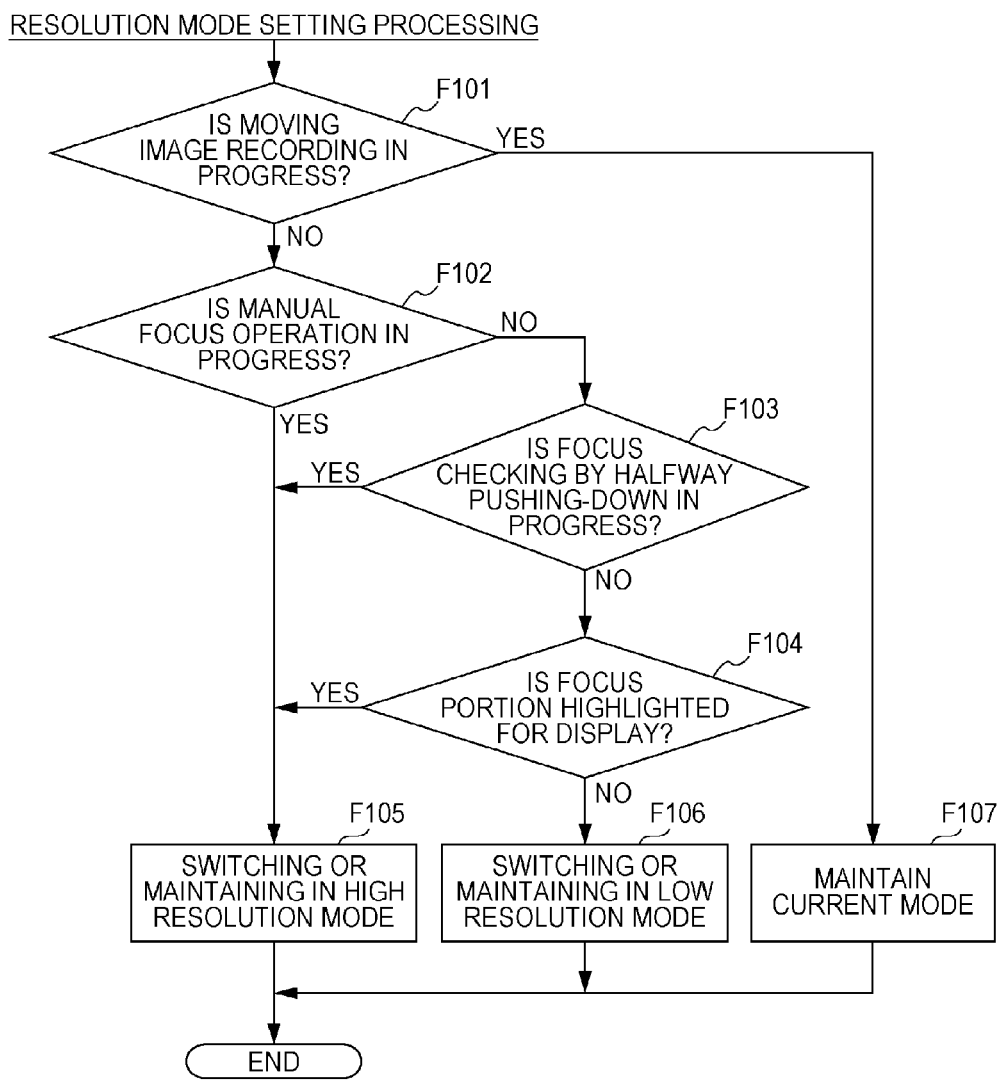

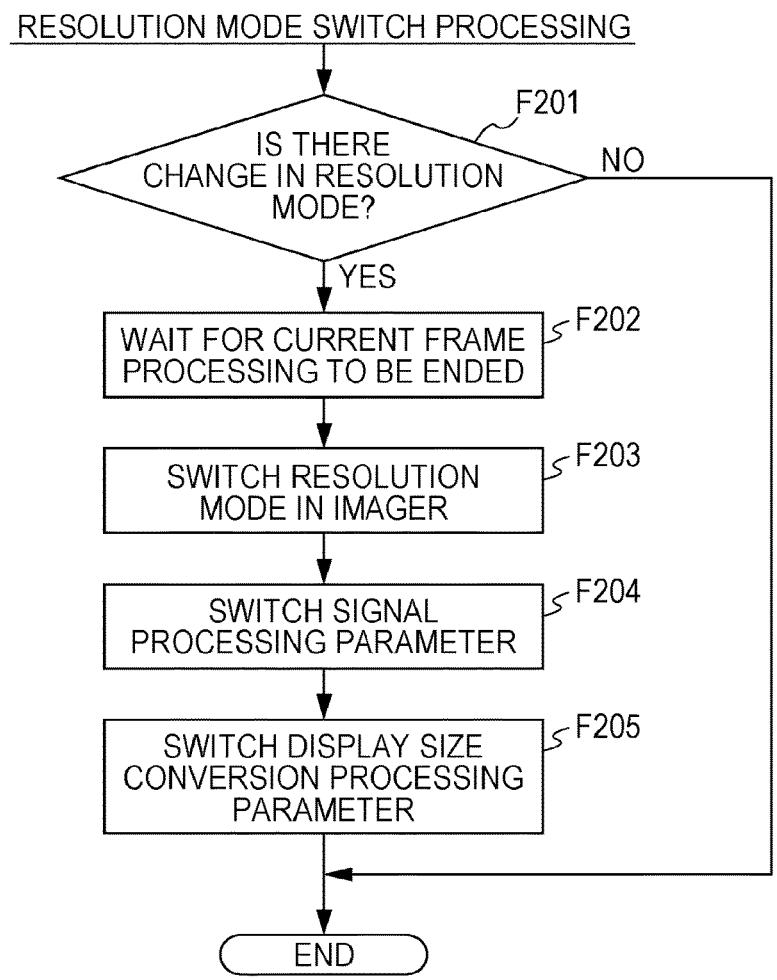

IMAGING APPARATUS, IMAGING METHOD, AND PROGRAM

CROSS REFERENCE TO RELATED APPLICATIONS

The present application is a continuation application which claims the benefit of priority under 35 U.S.C. § 120 of U.S. patent application Ser. No. 14/250,857, filed Apr. 11, 2014, and claims the benefit of Japanese Priority Patent Application JP 2013-101051 filed May 13, 2013, the entire contents of which are incorporated herein by reference.

BACKGROUND

The present technology relates to an imaging apparatus for and a method of performing imaging of a photographic subject and a program that realizes the imaging of the photographic subject.

In an imaging apparatus, such as a digital still camera and a digital video camera, normally, a user performs still image recording or starts moving image recording by pushing down a shutter button in a state where a user performs focusing on a photographic subject. In order to perform the focusing or focus checking, the user checks a monitoring image (a through image) of the photographic subject that is displayed on a display unit or a view finder that is provided in the imaging apparatus.

In Japanese Unexamined Patent Application Publication No. 2007-13926 is disclosed a technology that improves visual recognizability when the user checks a focus state, by largely displaying an image on the display unit at the time of a focusing operation.

SUMMARY

Incidentally, in the imaging apparatus, it is considered that the number of pixels that are output from an imager is decreased when monitoring of the photographic subject is in progress (for example, before performing a shutter operation for a still image or before starting the moving image recording). For example, in a camera equipped with the imager with a resolution of 16 mega pixels, a photoelectric conversion signal is output, as an output from the imager that is being monitored, by thinning spacing between the pixels and a capture image signal with a very low resolution, such as 320×240 pixels, is obtained. When in the imager, the spacing is thinned between the pixels in this manner and thus the photoelectric conversion signal is output, an effect of largely reducing power consumption is obtained and monitoring display is updated at a sufficient frame rate. Thus, a monitoring image in which motion is smooth can be provided.

However, the visual recognizability for the focus checking on a screen is reduced by thinning the spacing between the pixels. For example, the user has difficulty checking whether or not the image is in focus in a state where the screen is viewed, and although a function of performing highlighting of a focus portion (also referred to as peaking) is used, it is difficult to properly detect the focus portion in terms of image analysis.

This is because while the checking of the focus is performed by viewing an intensity of a high frequency component of the image, an aliasing phenomenon occurs by the spacing thinning and thus the high frequency component is changed into a false low frequency component. Instead of simply thinning the spacing, when a mode in which the multiple adjacent pixels of the same color are added and averaged and then are read is used, the aliasing phenomenon can be prevented. However, because the high frequency component is lost due to adding and averaging processing when such a mode is used, likewise, it is not possible to recognize the intensity of the high frequency component necessary for the checking the focus.

As disclosed in Japanese Unexamined Patent Application Publication No. 2007-13926, the use of the enlarged image for the focus checking is considered, but when the monitoring is performed with the enlarged image, because a display angle is changed, the user has difficulty performing framing (checking of the photographic subject and adjusting of a compositional arrangement).

Furthermore, even though one portion of the capture image signal that is output at a low resolution from the imager is displayed in an enlarged manner, the image has no choice but to be coarse.

It is desirable to improve visual recognizability for a focusing operation or focus checking without changing the display angle while obtaining an effect of reducing power consumption due to a low-resolution output from an imager (a photoelectric conversion unit).

According to an exemplary embodiment of the present technology, an image processing system includes circuitry that determines whether a focus operation is performed on an image, and processes the image in a high resolution mode when the focus operation is determined to be performed. The circuitry processes the image in a low resolution mode when the focus operation is determined not to be performed, and a resolution of the image is lower in the low resolution mode than in the high resolution mode.

According to another exemplary embodiment, an image processing method for an image processing system includes determining, in circuitry, whether a focus operation is performed on an image, and processing, in the circuitry, the image in a high resolution mode when the focus operation is determined to be performed. The method also includes processing, in the circuitry, the image in a low resolution mode when the focus operation is determined not to be performed, where a resolution of the image is lower in the low resolution mode than in the high resolution mode.

According to a further exemplary embodiment, a non-transitory computer-readable medium is encoded with computer-readable instructions that, when executed by a computer, cause the computer to perform a method including determining whether a focus operation is performed on an image. The method also includes processing the image in a high resolution mode when the focus operation is determined to be performed, and processing the image in a low resolution mode when the focus operation is determined not to be performed. A resolution of the image is lower in the low resolution mode than in the high resolution mode.

Additional exemplary features are also possible as described below.

For example, if a user (a photographer) checks the photographic subject with a monitoring image during a period of time before performing a shutter operation or a recording starting operation in order to perform image recording of a still image or a moving image, a very high-definition image, as the monitoring image, is not entirely necessary.

Accordingly, during the period of time, the capture image signal is made to be read at a low resolution mode from the photoelectric conversion unit and this is suitable for obtaining an effect of saving electric power.

However, if the focusing (a focus changing operation), focus checking, and the like are performed, measurable image quality of the monitoring image also may take priority in such a manner that a focus state is easy to recognize.

Accordingly, if the operation state relating to the focusing is detected, the switching is made from the low resolution mode to the high resolution mode.

In the imaging apparatus according to the present technology described above, the control unit may not perform switching control of the resolution mode for the photoelectric conversion unit while moving image recording is in progress.

When moving image recording is in progress, the changing of a resolution of image data on each frame that makes up the moving image is not preferable and thus the changing of the resolution is limited to the resolution mode switching.

In the imaging apparatus according to the present technology described above, if it is detected, as the operation state relating to the focusing, that a manual focus operation is in progress, the control unit may perform the control of switching the capture image signal output from the photoelectric conversion unit to the high resolution mode.

In the imaging apparatus according to the present technology described above, if it is detected, as the operation state relating to the focusing, that an auto focus operation is in progress or that checking of a focus state created by the auto focus operation is in progress, the control unit may perform the control of switching the capture image signal output from the photoelectric conversion unit to the high resolution mode.

In the imaging apparatus according to the present technology described above, if it is detected, as the operation state relating to the focusing, that executing of a function of performing highlighting of a focus portion on monitoring display is in progress, the control unit may perform the control of switching the capture image signal output from the photoelectric conversion unit to the high resolution mode.

These are the cases when the user diligently makes a focus adjustment using the manual focus operation or the auto focus function or when the user diligently checks a focus state (the photographic subject in the focus state) using the highlighting of a focus portion. Therefore, in the cases described above, the monitoring image that is high in image quality is provided using the high resolution mode and the ease with which the focus adjustment or the focus checking is performed is realized.

In the imaging apparatus according to the present technology described above, the control unit may perform the switching control of a parameter relating to capture image signal processing, in association with the switching of the resolution mode for the photoelectric conversion unit.

Because the capture image signals that differ in resolution are output from the photoelectric conversion unit by switching the resolution mode, it is possible to properly correspond to the capture image signals that differ in resolution in the capture image signal processing.

In the imaging apparatus according to the present technology described above, according to the switching of the resolution mode by the photoelectric conversion unit, the control unit may perform the switching control of parameters relating to image enlargement and reduction processing and image reduction processing for generating the display data in the display data generation unit.

Because the capture image signals that differ in resolution are also output from the photoelectric conversion unit by switching the resolution mode, the image just as is, as the monitoring image, changes in size. Accordingly, the enlargement processing or reduction processing is properly performed in such a manner that the display is performed at the same size as before.

In the imaging apparatus according to the present technology described above, the multiple resolution modes that are switchable in the photoelectric conversion unit may include at least the high resolution mode that is low in a rate of thinning spacing between pixels and the low resolution mode that is high in the rate of thinning the spacing between the pixels. That is, the low resolution mode and the high resolution mode are to be the resolution modes that differ in spacing thinning rate.

According to another embodiment of the present technology, there is provided an imaging method in use for an imaging apparatus including a photoelectric conversion unit which outputs a capture image signal as an electrical signal in response to receiving light from a photographic subject and in which for the outputting of the capture image signal, multiple resolution modes differing in resolution are switchable while still maintaining a viewing angle as in a capture image, and a display data generation unit that generates display data that is used in monitoring display of the imaged photographic subject, based on the capture image signal that is output from the photoelectric conversion unit, in which a capture image signal output from the photoelectric conversion unit is switched to a high resolution mode if an operation state relating to focusing is detected when the capture image signal output from the photoelectric conversion unit is executed in a low resolution mode.

That is, when the operation state relating to the focusing is detected, an operation of switching the resolution mode from the low resolution mode to the high resolution mode is executed in the imaging apparatus.

According to a still another embodiment of the present technology, there is provided a program for causing an arithmetic processing unit to execute a process including detecting an operation state of an imaging apparatus that includes a photoelectric conversion unit which outputs a capture image signal as an electrical signal in response to receiving light from a photographic subject and in which for the outputting of the capture image signal, multiple resolution modes differing in resolution are switchable while maintaining a viewing angle as in a capture image, and a display data generation unit that generates display data that is used in monitoring display of the imaged photographic subject, based on the capture image signal that is output from the photoelectric conversion unit, executing a capture image signal output from the photoelectric conversion unit in a low resolution mode, and performing control of switching the capture image signal output from the photoelectric conversion unit in a high resolution mode, if the operation state relating to focusing is detected by the detecting of the operation state of the imaging apparatus when the capture image signal output from the photoelectric conversion unit is executed in the low resolution mode.

The image device and the imaging method that are described above are realized by the programs, using an arithmetic processing unit.

According to the embodiments of the present technology, while the reduction of power consumption is performed by the output with a low resolution from the photoelectric conversion unit, if the operation state relating to the focusing is present, the image quality of the monitoring image can be improved without changing the display angle. This can improve the visual recognizability at the time of the focusing operation or the focus checking and improve the operability relating to the focus operation or the focus checking.

BRIEF DESCRIPTION OF THE DRAWINGS

FIG. 4 is a diagram for describing image data for a processing process in a low resolution mode and in a high resolution mode according to the embodiment.

FIG. 5 is a flowchart of resolution mode setting processing according to a first embodiment.

FIG. 6 is a flowchart of resolution mode switching processing according to an embodiment.

DETAILED DESCRIPTION OF EMBODIMENTS

Embodiments are described below in the following order.
1. Configuration of Imaging Apparatus
2. Processing relating to Resolution Mode according to First Embodiment
3. Processing relating to Resolution Mode according to a Second Embodiment
4. Program
5. Modification Examples

1. Configuration of Imaging Apparatus

Figure 1:
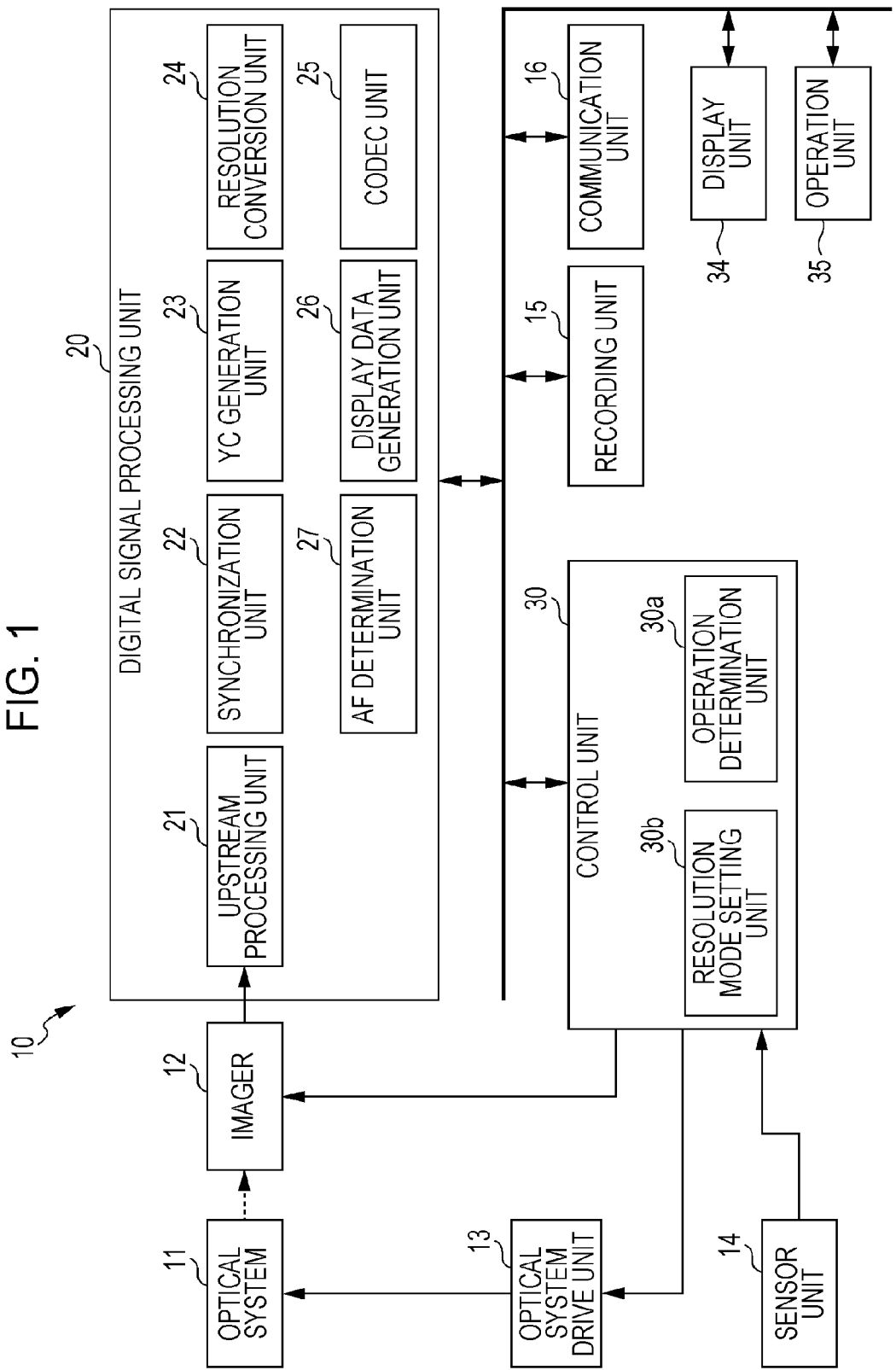
FIG. 1 is a block diagram of an imaging apparatus according to an embodiment of the present technology.

A configuration of an imaging apparatus 10 according to an embodiment is described referring to FIG. 1. The imaging apparatus 10 is a device that is regarded as a so-called digital still camera or a digital video camera and performs imaging/recording of a still image or a moving image.

As illustrated in FIG. 1, the imaging apparatus 10 has an optical system 11, an imager 12, an optical system drive unit 13, a sensor unit 14, a recording unit 15, a communication unit 16, a digital signal processing unit 20, a control unit 30, a display unit 34, and an operation unit 35.

The optical system 11 includes lenses, such as a cover lens, the zoom lens, and a focus lens, and a diaphragm mechanism. The optical system 11 concentrates light from a photographic subject on the imager (photoelectric conversion unit) 12.

The imager 12 has, for example, an imaging element that is formed by arranging photoelectric conversion pixels, which are of a charge coupled device (CCD) type, or of a complementary metal oxide semiconductor (CMOS) type, in the form of a matrix.

In the imager 12, for example, correlated double sample (CDS) processing, automatic gain (AGC) control processing, and the like are executed on an electrical signal that is obtained by photoelectric conversion in the imaging element and analog/digital (A/D) conversion processing is performed on the electrical signal. Then, a capture image signal (hereinafter referred to as capture image data) as digital data is output to the digital signal processing unit 20 on the downstream side.

Furthermore, in the imager 12, with respect to an output from the imaging element, the multiple resolution modes in which a viewing angle as in a capture image is still maintained and which differ in resolution are set to be switchable. As described below, at least the switching is set to be possible between a low resolution mode that decreases the number of pixels by increasing a spacing thinning rate between pixels and a high resolution mode that increases the number of pixels by decreasing the spacing thinning rate between pixels lower than that of the low resolution mode (including the absence of the spacing between pixels).

Additionally, the expression "the viewing angle is maintained" means that a range of the photographic subject included in one frame of the capture image is substantially the same. The definition of the differing resolution modes as the resolution modes that differ in the spacing thinning rate is that the capture image data that differ in resolution is obtained while maintaining the range of the photographic subject included in the image in substantially the same manner.

Figure 2B:
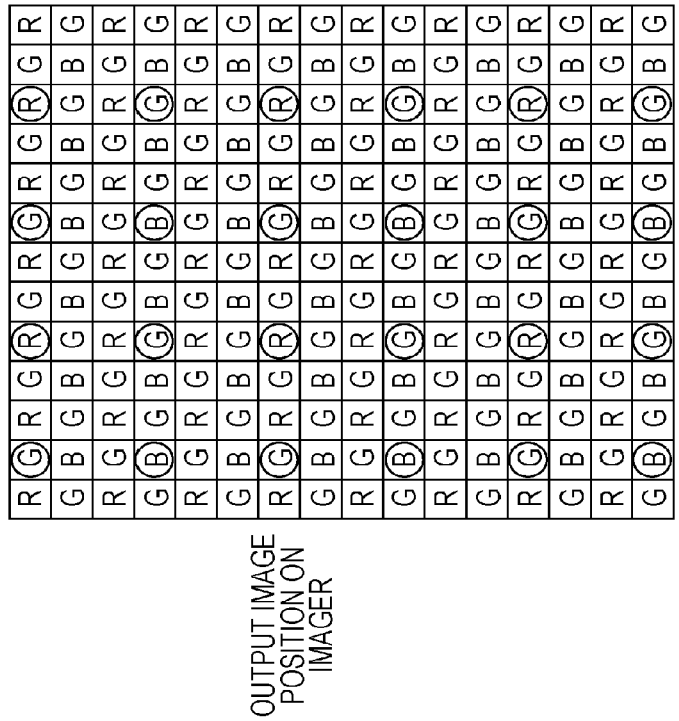
FIGS. 2A and 2B are diagrams for describing resolution modes for an imager according to an embodiment.
Figure 2A:
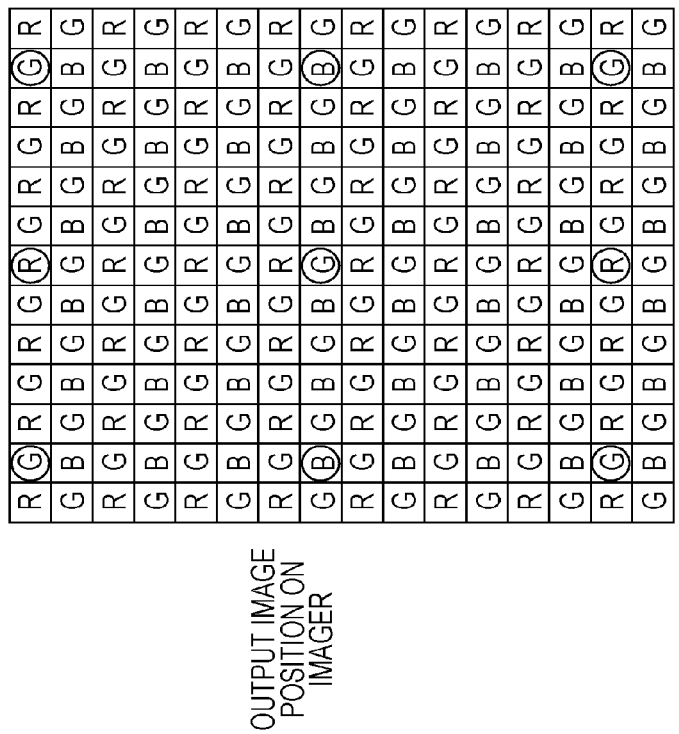

FIGS. 2A and 2B illustrate one example of the low resolution mode and the high resolution mode. FIG. 2A illustrates an output pixel on the imager 12 in the low resolution mode. FIG. 2B illustrates the output pixel on the imager 12 in the high resolution mode. A pixel marked O is the output pixel on the imager 12.

As illustrated, if each photoelectric conversion pixel of R (red), G (green) and B (blue) are arranged in the form of a matrix, for example, in the low resolution mode, one pixel in a range of 5 pixels in the horizontal direction (the transverse direction) is output, and one line every 7 lines in the vertical direction (the longitudinal direction) is output. In the high resolution mode, one pixel in a range of 3 pixels in the horizontal direction (the transverse direction) is output, and one line every 4 lines in the vertical direction (the longitudinal direction) is output.

For example, the capture image data that is substantially the same in the viewing angle and differ in resolution is obtained in this manner by making the low resolution mode and the high resolution mode differ in the spacing thinning rate between the photoelectric conversion pixels.

Of course, the spacing thinning rate between the low resolution mode and the high resolution mode is not limited to the example in FIGS. 2A and 2B. The high resolution mode may be set to be a mode in which the spacing-thinning is absent (all the photoelectric conversion pixels are output) and may be set to be a mode in which a spacing thinning rate other than that in FIG. 2B is available. The low resolution mode may be set to be a mode in which the outputting at the spacing thinning rate higher than that in the high resolution mode (the outputting of the small number of pixels) is possible.

The low resolution mode naturally reduces image quality of the capture image data, but is suitable for reducing power consumption and extending the life of a battery. For example, because the in-progress displaying of the photographic subject monitoring image (hereinafter referred to as a "through-image") on which the recording is not performed, although it reduces the image quality to a small extent, does not cause a very serious problem, the low resolution mode that gives priority to reduction in power consumption is suitable.

In the high resolution mode, the capture image data that is higher in image quality than in the low resolution mode is obtained.

Referring to FIG. 1, under the control of the control unit 30, the optical system drive unit 13 drives the focus lens in the optical system 11 and executes a focus operation. Furthermore, under the control of the control unit 30, the optical system drive unit 13 drives the diaphragm mechanism in the optical system 11 and performs exposure adjustment. Moreover, under the control of the control unit 30, the optical system drive unit 13 drives the zoom lens in the optical system 11 and executes the zoom operation.

Additionally, not only driving, as auto focus in which the control unit 30 controls operation of the optical system drive unit 13 in response to detection of a focus state of the capture image, but also driving, as manual focus in which the control unit 30 controls the operation of the optical system drive unit 13 in response to the operating by the user of a focus operator, is performed on the focus lens.

The digital signal processing unit 20 is configured, for example, from a digital signal processor (DSP) that functions as an image processing processor. The digital signal processing unit 20 performs various signal processing tasks on a digital signal (the capture image data) from the imager 12.

For example, the digital signal processing unit 20 includes an upstream processing unit 21, a synchronization unit 22, a YC generation unit 23, a resolution conversion unit 24, a codec unit 25, a display data generation unit 26, and an auto focus determination unit 27 (hereinafter referring to an AF determination unit).

The upstream processing unit 21 performs clamp processing that clamps black levels of R, G, and B to a predetermined level, compensation processing between color channels of R, G, and B, or the like, on the capture image data from the imager 12.

The synchronization unit 22 performs de-mosaic processing in such a manner that image data for each pixel has color components of all R, G, and B.

The YC generation unit 23 generates (separates) a luminance (Y) signal and a color (C) signal from the image data on R, G, and B.

The resolution conversion unit 24 performs a necessary resolution conversion processing, for example, a resolution conversion for recording or communication output on the image data on which the various signal processing tasks are executed.

The codec unit 25 performs, for example, coding processing for recording or communication on the image data that is resolution-converted.

Under the control of the control unit 30, the display data generation unit 26 generates, for example, display data as the through image that is output to the display unit 34.

The display data as the through image is basically data on each frame as the capture image data that is resolution-converted in the resolution conversion unit 24, but performs resizing (enlargement·reduction) particularly for matching to a display size in the display unit 34 and thus generates the display data. That is, the resolution conversion for matching to a display panel of the display unit 34 is added.

For example, the display data generation unit 26 generates the display data for displaying the through image, based on the capture image data, when the user searches for the photographic subject for the capture recording of the still image, when the recording of the moving image is in a standby state, and so on. Then, the display data is supplied to the display unit 34 and the displaying of the through image is performed.

Figure 3A:
FIGS. 3A and 3B are diagrams for describing highlighting of a focus portion according to the embodiment.
Figure 3B:

Furthermore, the display data generation unit 26 performs processing for the highlighting (peaking) of a focus portion. For example, the pixel in a focus state where a high frequency component (an edge component) is high is selected from the image data as the through image, and image processing is performed on the corresponding pixel in such a manner that the corresponding pixel is highlighted in the display unit 34 and thus provided to the user. For example, the focus portion is detected from the capture image data as illustrated in FIG. 3A, and the highlighting is performed using a technique, such as increasing luminance of the pixel that is detected as the focus portion, as illustrated in FIG. 3B, or changing color information. The display data accompanied by such highlighting is generated and is displayed on the display unit 34. As a result, the user can perform focus checking (checking of the focus portion and the focus state) easily and accurately. For example, the user can adjust the focus by executing a manual or auto focus function while viewing the highlighting. Then, if an edge of a desired portion of the photographic subject is highlighted, the focusing can be determined to be on the desired portion and thus the still image capture recording can be performed or moving image recording can be started.

Additionally, in an example in FIG. 4, the display data generation unit 26 is illustrated as being configured to have a function that is executed in the digital signal processing unit 20, but this is one example and the control unit 30, as the display data generation unit 26, may execute the processing.

The AF determination unit 28 checks a current focus state of frame image data at the time of an auto focus operation. For example, an evaluation value is obtained. According to the evaluation value, the focus state is determined using a technique, such as detecting high frequency component energy of the image data. At the time of the auto focus, the control unit 30 performs control in such a manner that the optical system drive unit 13 executes focus lens driving to create the focus state, while checking the evaluation value from the AF determination unit 28.

The control unit 30 is configured from a microcomputer (an arithmetic processing unit) including a central processing unit (CPU), read only memory (ROM), random access memory (RAM), and so on.

The CPU controls the entire imaging apparatus 10 in an integrating manner by executing a program that is stored in the ROM or flash memory.

The RAM is used in temporarily storing the data, the program, and the like, as a working region when the CPU performs various data processing tasks, The ROM or the flash memory (nonvolatile memory) is used in storing an operating system (OS) necessary for the CPU to control each unit, application programs for various operations in addition to content files such as an image file, firmware, or the like. In the present example, a program for executing processing for switching between the resolution modes for the imager 12 is also stored.

In the digital signal processing unit 20, the control unit 30 controls necessary operation of each unit, with respect to parameter control of various signal processing tasks, an imaging operation or recording operation in response to a user operation, an operation of reproducing the recorded image file, camera operations such as zooming, focusing, and exposure adjustment, and a user interface operation.

Furthermore, according to the present embodiment, with regard to the control of the resolution mode for the imager 12 described above, the control unit 30 includes functions, as an operation determination unit 30a, and the resolution mode setting unit 30b.

The operation determination unit 30a performs detection and determination of an operation state of the imaging apparatus 10. For example, the operation determination unit 30a performs the detection and determination of the operation state, such as when still image recording or operation recording is in the standby state, when moving image recording is in progress, when reproducing is in progress, when a focus operation (focusing) is in progress, when highlighting is in progress, and so on.

The resolution mode setting unit 30*b* performs the control of the resolution mode for the imager 12, in response to the operation state detected by the operation determination unit 30*a*. For example, when the still image recording or the operation recording is in the standby state, the control is performed for switching to the low resolution mode.

Additionally, the operation determination unit 30*a* and the resolution mode setting unit 30*b* may be realized as functions of the digital signal processing unit 20.

The display unit 34 is a display unit that performs various displays for the user (a photographer and the like), and for example, is formed by having a display device, such as liquid crystal display (LCD) or an organic electro-luminescence (EL) display, formed on a case of the imaging apparatus 10. Additionally, the display unit 34 may be formed in the form of a so-called view finder, using the LCD, the organic EL display or the like.

The display unit 34 is made from the display device described above and a display driver that executes displaying on the corresponding display device. The display driver executes various displays on the display device, based on an instruction from the control unit 30. For example, the display driver displays for reproduction, a still image or a moving image that is captured and recorded in a recording medium, or displays the through image as the moving image resulting from the capture image data on each frame that is imaged while release (a shutter operation) is in a waiting state, on a screen of the display device according to the display data from the display data generation unit 26. The highlighting is performed on the through image as well. Furthermore, the display driver executes the display of various operation menus, an icon, a message, and the like, as a graphical user interface (GUI), on the screen.

The operation unit 35 has an input function of inputting a user's operation, and transmits a signal in response to the operation that is input, to the control unit 30.

The operation unit 35 is realized, for example, as the various operators provided on the case of the imaging apparatus 10, or a touch panel or the like that is formed on the display unit 34.

As the operator on the case, a reproduction menu starting button, a determination button, a directional key, a cancel button, a zoom key, a slide key, a shutter button (a release button), a focus ring as the operator, for the manual focus, and the like are provided.

Furthermore, various operations may be possible by a touch panel operation that uses the icon, the menu, or the like that is displayed on a touch panel and the display unit 34.

The recording unit 15 is made, for example, from non-volatile memory, and functions as a storage region in which the image file (the content file) is stored, such as still image data or moving image data, attribute information on the image file, or a thumbnail image.

The image file is stored, for example, in such a format as the joint photographic experts group (JPEG) format, the tagged image file format (TIFF), or the graphics interchange format (GIF).

Actual forms of the recording unit 15 are considered in various ways. For example, the recording unit 15 may be a flash memory built in the imaging apparatus 10. The recording unit 15 may be configured to include a memory card (for example, a portable flash memory) that can be detachably attached to the imaging apparatus 10 and a card recording reproduction unit that performs recording reproduction access to the memory card. Furthermore, the recording unit 15 may be realized as a hard disk drive (HDD) built into the imaging apparatus 10.

Furthermore, in the present example, a program for causing the control unit 30 to execute the processing relating to the resolution mode for the imager 12 may be stored in the recording unit 15.

The communication unit 16 performs data communication or network communication between the communication unit 16 and an external device in a wireless or cable manner.

For example, the communication unit 16 performs capture image data (a still image file or a moving image file) communication between the communication unit 16 and an external display device, a recording device, a reproduction device or the like. Furthermore, the communication unit 16, as a network communication unit, may perform communication over various networks such as the Internet, a home network, a local area network (LAN) and may perform various data transmission and reception between the communication unit 16 and a server on the network, a terminal, or the like.

For example, the display data as the through image or a reproduction image can be transmitted to an external display device by the communication unit 16 and thus be displayed. That is, the various displays on the display unit 34 may be executed on the external display device.

The sensor unit 14 represents various sensors comprehensively. For example, a gyro sensor (an angular velocity sensor), an acceleration sensor, and the like are provided for detecting all movements of the imaging apparatus 10, such as a camera shake, or a position or movement (a pan movement, a tilt movement, and the like) of the imaging apparatus 10.

Furthermore, an illumination sensor that detects external illumination for the exposure adjustment and the like and a distance measurement sensor that measures a distance to the photographic subject may be provided.

Furthermore, there is a case where, as the sensor unit 14, a zoom lens position sensor that detects a position of the zoom lens and a focus lens position sensor that detects a position of the focus lens are provided in the optical system 11.

Furthermore, there is a case where, as the sensor unit 14, a sensor that detects an amount of opening in a mechanical iris (a diaphragm mechanism) is provided.

The various sensors of the sensor unit 14 transmit their respective detected pieces of information to the control unit 30. The control unit 30 can perform various types of control using the pieces of information detected in the sensor unit 14.

2. Processing Relating to the Resolution Mode According to First Embodiment

The processing relating to the resolution mode for the imager 12 that is executed in the imaging apparatus 10 with the configuration described above is described.

In the imaging apparatus 10 according to the present embodiment, for a period of time before performing the shutter operation for the still image capture recording, or when moving image capture recording is in the waiting state, the imager 12 basically operates in the low resolution mode at the expense of the image quality in order to suppress power consumption when performing the through image. However, such basic operation of the imager 12 is not suitable for the focusing, the focus checking, the highlighting, or the like. Then, if the operation state relating to the focusing is detected, the control unit 30 performs control in such a manner that a capture image signal output from the imager 12 is switched to the high resolution mode and temporarily operates in a state where priority is given to the image quality.

FIG. 4 schematically illustrates an image data state in the low resolution mode and in the high resolution mode.

For example, as illustrated, the processing for the through image display in the case of performing the imaging of a photographic subject G1, when broadly shown, includes imager's output ST1, development processing ST2, analysis/image conversion ST3, size conversion ST4 and display ST5 as illustrated.

The imager's output ST1 refers to the capture image data output from the imager 12.

The development processing ST2 refers to processing tasks by the upstream processing unit 21, the synchronization unit 22, and the YC generation unit 23 in the digital signal processing unit 20.

The analysis/image conversion ST3 refers to processing for the highlighting of the focus portion by the display data generation unit 26. For example, the detection of the focus portion within the image data is performed and a pixel to be highlighted is selected. Then, the processing is performed that changes a luminance value or the color information for the highlighting of the selected highlight pixel.

The size conversion ST4 refers to resizing processing in which the display data generation unit 26 performs matching to the display device (the display on the display unit 34).

In the display ST5, the display data is output from the display data generation unit 26. The display ST5 refers to the operation in which the through image is displayed in the display unit 34.

In this sequence of processing operations, the image data state in the low resolution mode is illustrated above a processing flow in FIG. 4. Additionally, an image size illustrated in the drawings and described below is only one example for description.

It is assumed that a size of the photoelectric conversion pixel of the imaging element in the imager 12 is 6,000×4,000 pixels.

In the low resolution mode, the imager 12 performs spacing thinning outputting at a comparatively high spacing thinning rate. At this point, as one example, the capture image data that is output from the imager 12 is set to have 320×240 pixels as illustrated as image data LG2.

In the low resolution mode, the development processing ST2 is performed on the image data LG2 with 320×240 pixels, and the analysis/image conversion ST3 is performed on image data LG3 with 320×240 pixels that goes through the development processing ST2.

Then, when a size of the display device is set to be 640×480 pixels, image data LG4 that goes through the analysis/image conversion ST3 is enlargement-processed by the size conversion ST4 and thus is set to be image data LG5 with 640×480 pixels. The image data LG5 is supplied, as the display data, to the display unit 34 and is display-output as the display ST5 (a display image LG6).

The low resolution mode produces a considerably greater power-saving effect and thus is useful. The higher the spacing thinning rate, the greater the obtained power-saving effect. However, a display image LG6 becomes a bokeh-processed image by the spacing thinning in the imager's output ST1 and by the enlargement in the size conversion ST4 (in the drawings, a dashed line indicates that the display image LG6 is in a bokeh state).

Furthermore, the image data LG2 and LG3 in the processing processes are images in which the spacing thinning is performed to a great extent due to the power saving or limited bandwidth, but because of this, it is not possible to execute the analysis/image conversion ST3 properly most of the time. That is, high band component energy is decreased, and it is not possible to perform the detection of the focus portion with high accuracy. Because of this, the highlighting of the focus portion also is not performed properly most of the time.

In contrast, the image data state in the high resolution mode is illustrated below the processing flow in FIG. 4.

In the high resolution mode, the imager 12 performs the outputting of the capture image data at a comparatively-low spacing thinning rate. For example, it is assumed that the capture image data with 1,280×960 pixels is output to be displayed as image data HG2.

In the high resolution mode, the development processing ST2 is performed on the image data HG2 with 1,280×960 pixels, and the analysis/image conversion ST3 is performed on image data HG3 with 1,280×960 pixels that goes through the development processing ST2.

Then, in response to the fact that the size of the display device is set to be 640×480 pixels, image data HG4 that goes through the analysis/image conversion ST3 is reduction-processed by the size conversion ST4 and thus is set to be image data HG5 with 640×480 pixels. The image data HG5 is supplied, as the display data, to the display unit 34 and is display-output as the display ST5 (a display image HG6).

In the high resolution mode, the high band component of the image data is seldom lost. A contrast rate of the focus portion also can be detected with somewhat high accuracy. Because of this, the analysis/image conversion ST3 is executed properly, and data conversion for the highlighting is performed properly as shown in the image data HG4. Furthermore, the display image HG6 can be set to be an image that is not bokeh-processed (somewhat bokeh-processed), and the user can correctly recognize the highlighting of the focus portion on the display as well.

However, the high resolution mode is more disadvantageous than the low resolution mode in terms of reduction of power consumption.

The low resolution mode and the high resolution mode have their respective advantages and disadvantages. According to the present embodiment, at this point, the switching is properly made between the low resolution mode and the high resolution mode according to the operation state.

FIG. 5 illustrates an example of resolution mode setting processing by the control unit 30.

For a period of time when capture image data output by the imager 12 is performed, the control unit 30 performs processing in FIG. 5 through the use of functions of the operation determination unit 30a and the resolution mode setting unit 30b.

In Step F101, the control unit 30 checks whether or not the moving image recording is currently executed. When the moving image recording is in progress, the proceeding to Step F107 takes place, and the control unit 30 maintains a current setting state of the resolution mode. That is, processing that changes the resolution mode is not performed. Accordingly, when the moving image recording is in progress, the resolution mode at the time of starting the moving image recording is set to be continued.

When the moving image recording is not in progress, the control unit 30 performs determination in Step F102, Step F103, and Step F104. In Step F102, it is determined whether or not the manual focus operation is in progress. If the user operates the operator for the manual focus, such as the focus ring provided in a lens body tube, in response to the operating of the operator, the control unit 30 controls the optical system drive unit 13 and executes a movement of the focus lens. If a manual focus operation is detected, for processing of the resolution mode, the control unit 30 proceeds to Step F105.

Furthermore, in Step F103, the control unit 30 determines whether or not the focus checking is in progress, by pushing the shutter button down halfway.

When the user pushes the shutter button down halfway, the control unit 30 performs focus lock control. That is, as auto focus control, while monitoring the evaluation value by the AF determination unit 27, the focus lens drive by the optical system drive unit 13 is executed, focus position is searched for, and thus creates the focus state. Then, during a period of time when the halfway pushing-down is continued, the focus state is maintained.

Accordingly, the case where the halfway pushing-down of the shutter button is detected is equivalent to the case where it is detected that as the operation state of the imaging apparatus 10, the auto focus operation is in progress or the checking of the focus state that is created by the auto focus operation is in progress.

Even though the halfway pushed-down state is detected, the control unit 30 proceeds to Step F105 as the processing relating to the resolution mode.

In Step F104, the control unit 30 detects whether or not the highlighting of the focus portion is currently in progress. The highlighting of the focus portion illustrated in FIG. 3B is performed in order for the user to easily check the focus portion. Therefore, there is a case where this highlighting function is automatically executed at the time of the manual focus operation or when the auto focus and the focus lock by the halfway pushing-down of the shutter button are in progress. This does not impose any limitation, and alternatively, there is also a case where the highlighting function is turned on by the user's operation. Moreover, a case is also considered where the highlighting is executed on a specific operation state of the imaging apparatus 10 or a state of the photographic subject (for example, at the time of the detection of a face). The case of executing the highlighting is variously considered in this manner, but in Step F104, it is determined whether or not the executing of the highlighting is in progress and if so, the control unit 30 proceeds to Step F105.

If from the determination in Step F102, F103, and F104 described above, the operation state corresponds to any one of the following states: when the manual focus operation is in progress, when the focus checking by the halfway pushing-down is in progress, and when the highlighting of the focus portion is in progress, the proceeding to Step F105 takes place, and the control unit 30 switches the imager 12 to the high resolution mode (if the imager 12 is already switched to the high resolution mode, the high resolution mode is continued).

On the other hand, if the operation state does not correspond to any one of the following operation states: when the manual focus operation is in progress, when the focus checking by the halfway pushing-down is in progress, and when the highlighting of the focus portion is in progress, in Step F106, the control unit switches the imager 12 to the low resolution mode (if the imager 12 is already switched to the low resolution mode, the low resolution mode is continued).

The control unit 30 performs the processing in FIG. 5, for example, at every frame timing when the capture image data is obtained.

Eventually, if the operation state corresponds to any one of the following operation states: when the manual focus operation is in progress, when the focus checking by the halfway pushing-down is in progress, and when the highlighting of the focus portion is in progress, the imager 12 is set to be in the high resolution mode. Then, before any one of the operation states above described is present, or after any one of the operation states above described is terminated, the imager 12 is set to be in the low resolution mode.

FIG. 6 illustrates processing by the control unit 30 in the case of switching the resolution mode in Steps F105 or F106.

If the switching of the resolution mode setting occurs, the control unit 30 causes the processing in FIG. 6 to proceed from Step F201 to F202. First, the control unit waits for terminating of the current frame processing. The imager 12 repeatedly reads a photoelectric conversion signal from every frame, and outputs the capture image data. However, it is understandable that the switching of the resolution mode while reading the photoelectric conversion signal from a certain frame is not appropriate. Accordingly, the control unit waits for the imager 12 to terminate the outputting of the current frame.

If the current frame processing is terminated, the control unit 30 instructs the imager 12 to switch the resolution mode in Step F203. By doing this, the imager 12 switches the resolution mode, beginning with the next frame. That is, the spacing thinning rate of the photoelectric conversion signal that is read is changed.

The control unit 30 performs the control of signal processing parameter switching in Step F204.

When the resolution mode for the imager 12 is changed, it is necessary to change a parameter for the development processing (ST2) in accordance with this change. For example, a parameter for a flicker width that is used in compensating for flicker in the upstream processing unit 21 is in proportion to the resolution in the longitudinal direction. Furthermore, it is necessary to assign information, as the parameter, on a size or an effective range of the image in filter processing by the synchronization unit 22 and the like. The parameters are set again in response to the switching of the resolution mode because an optimal value is changed when the resolution of the capture image data from the imager 12 is changed.

The control unit 30 performs the switching of a size conversion processing parameter for display in Step F205. For example, in FIG. 4, as the size conversion ST4, in the case of the low resolution mode, the image data LG4 with 320×240 pixels is enlarged into the image data LG5 with 640×480 pixels. On the other hand, in the case of the high resolution mode as the size conversion ST4, an example in which the image data HG4 with 1,280×960 pixels is reduced into the image data HG5 with 640×480 pixels is given. In this manner, in the high resolution mode and the low resolution mode, the processing that is executed as the size conversion ST4 for display differ in reduction and enlargement. Accordingly, the control unit 30 performs a parameter change that sets the processing that is executed as the size conversion ST4 in Step F205.

Of course, this switching between the reduction and the enlargement is one example, and for example, there is also a case where the enlargement is performed in the high resolution mode as well. For example, if 640×480 pixels are a display screen size, when the high resolution mode is at 600×400 pixels and so on and the low resolution mode is at 400×200 pixels and so on, the enlargement is performed as the size conversion ST4 in any mode. Conversely, pixel size setting in which the reduction is also performed in the size conversion ST4 in any mode is possible as well.

However, although the switching is made to any mode, the high resolution mode and the low resolution mode differ in enlargement rate (or reduction rate) in the size conversion ST4. Accordingly, in this case, the control unit 30 performs the switching of the parameter, which is the enlargement rate or the reduction rate, as the size conversion processing parameter in Step F205.

Although the resolution mode setting in the imager 12 is changed, a screen display size is prevented from changing by the processing in Step F205.

As illustrated in FIG. 6, at the time of performing the switching of the resolution mode for the imager 12, the control unit 30 performs the switching of the signal processing parameter and the size conversion processing parameter as well, in accordance with the resolution mode.

The control unit 30 performs the processing in FIG. 5 and FIG. 6 and thus the following effects according to the present embodiment are obtained.

The imaging apparatus 10 according to the embodiment includes the imager 12 which outputs the capture image signal as the electrical signal in response to receiving light from the photographic subject and in which for the outputting of the capture image signal, the multiple resolution modes (the high resolution mode and the low resolution mode) differing in resolution are switchable while maintaining the viewing angle as in the capture image. Furthermore, the imaging apparatus 10 includes the display data generation unit 26 (the digital signal processing unit 20) that generates the display data that is used in the monitoring display of the imaged photographic subject, based on the capture image data that is output from the imager 12. Furthermore, the imaging apparatus 10 includes the control unit 30 that performs the control of switching the imager 12 to the high resolution mode if the operation state relating to the focusing is detected when the output from the imager 12 is executed in the low resolution mode.

In the imaging apparatus 10 with this configuration, first, an effect of reducing power consumption, resulting from the low resolution mode, can be obtained and an extension of the life of a battery can be accomplished, when the user (the photographer) checks the photographic subject through the through image (a monitoring image) during a period of time before performing the shutter operation for the still image recording or the starting operation for the moving image recording. In this case, the display image quality of the through image is reduced, but because in the first place the through image is for determining a compositional arrangement or roughly checking the photographic subject and thus the so-high quality is not necessary, particularly, the fact that the through image is of low quality itself is not a problem. However, if the focusing (a focus changing operation), the focus checking, and the like are performed, the image quality of the through image may be improved in such a manner that the user easily checks the focus state from the through image. Accordingly, at the time of detecting the operation state relating to the focusing, the switching is made from the low resolution mode to the high resolution mode. That is, because a focusing condition is checked with high accuracy, the pixels are read in greater quantities from the image 12 when the focus checking is in progress. Thus, the high frequency component of the image is easy to visually recognize, and the visual recognizability is improved at the time of the focusing operation and the focus checking.

Furthermore, in the case of performing the resolution mode switching, a change in the viewing angle is prevented and a user's framing operation is not obstructed by changing the spacing thinning rate while maintaining a size of a range of outputting the photoelectric conversion pixels from the image 12. That is, even though the resolution mode switching is performed, the user can continuously check the photographic subject in the same state of the viewing angle.

That is, because a width (the viewing angle) of a reading region on the image 12 is not changed when the number of output pixels is decreased by the spacing thinning, the user can perform the framing (the checking of the photographic subject and the adjusting of the compositional arrangement) without recognizing the decrease in the number of output pixels while viewing a monitoring image.

Furthermore, the control unit 30 does not perform switching control of the resolution mode when the moving image recording is in progress.

For example, even though the user performs the focusing operation, when the moving image recording is in progress, the resolution mode for the imager 12 may not be changed. If a reading resolution is changed when the moving image recording is in progress, an appearance in which the image quality momentarily changes between the frames remains in a record image and the quality of the record image is reduced. Furthermore, because the number of read pixels that result from considering a frame rate is normally used while the moving image recording is in progress, when the number of read pixels is increased, this causes a decrease in the frame rate and thus this is not preferable.

Accordingly, even though the moving image recording is in progress, for example, even though the focusing is performed, the proper moving image recording data is maintained without causing an adverse effect on the moving image recording by imposing the limitation on the resolution mode switching. Not performing the resolution mode switching when the moving image recording is in progress is considerably important processing for the imaging device equipped with an actual moving image capture function.

Furthermore, in the imaging apparatus 10 according to the embodiment, the control unit 30 performs the control to make the switching to the high resolution mode, in the following operation state relating to the focusing: when the manual focus operation is detected as being in progress, when the auto focus operation is detected as being in progress, when the checking of the focus state that is created by the auto focus operation is detected as being in progress (when the halfway pushing-down is in progress), or when the executing of the highlighting of the focus portion is detected as being in progress.

These are the cases when the user diligently makes a focus adjustment using the manual focus operation or the auto focus function or when the user diligently checks a focus state (the photographic subject in the focus state) using the highlighting of the focus portion. Accordingly, in the cases described above, the monitoring image that is high in image quality is provided using the high resolution mode and thus the ease with which the focus adjustment or the focus checking is performed is improved.

Furthermore, when the executing of the highlighting is in progress, the setting to the high resolution mode can improve the accuracy with which the highlighting is performed and provide the user with the proper focus portion.

Furthermore, because the setting to the low resolution mode is performed although the operation state corresponds to any of the following states: when the manual focus operation is in progress, when the focus checking by the halfway pushing-down is in progress, and when the highlighting of the focus portion is in progress, the most optimal operation mode of the low resolution mode (the reduction of power consumption takes priority) and the high resolution mode (the image quality takes priority) can be provided according to operation situations. Accordingly, the number of capture image sheets per battery can be increased while improving operability relating to the focusing or the focus checking. That is, according to the operation state, the switching is made between the image quality and the reduction of power consumption in terms of priority, and usability improvement and the long usage can be compatible.

Furthermore, the control unit 30 performs the switching control of the parameter relating to capture image signal processing, in association with the switching of the resolution mode. Even though the resolution of the capture image data that is supplied in this manner is changed, corresponding to this change, the state where proper image signal processing is performed can be maintained and the image can be continuously displayed without failure.

Furthermore, in association with the switching of the resolution mode, the control unit 30 performs the switching control of the parameters for the image enlargement processing and the image reduction processing for generating the display data in the display data generation unit 26. When the viewing angle of the through image displayed by the change of the resolution mode is changed, the framing becomes difficult. For this reason, the viewing angle that is displayed on a panel is prevented from changing by changing the parameters for the enlargement processing and the reduction processing (the size conversion ST4) of a panel output image in such a manner as to negate the change in the viewing angle. By doing this, the user's framing is not obstructed and the user can be prevented from feeling discomfort that is caused by a phenomenon in which the viewing angle is suddenly changed on the display when the focus operation is performed.

Figure 7:
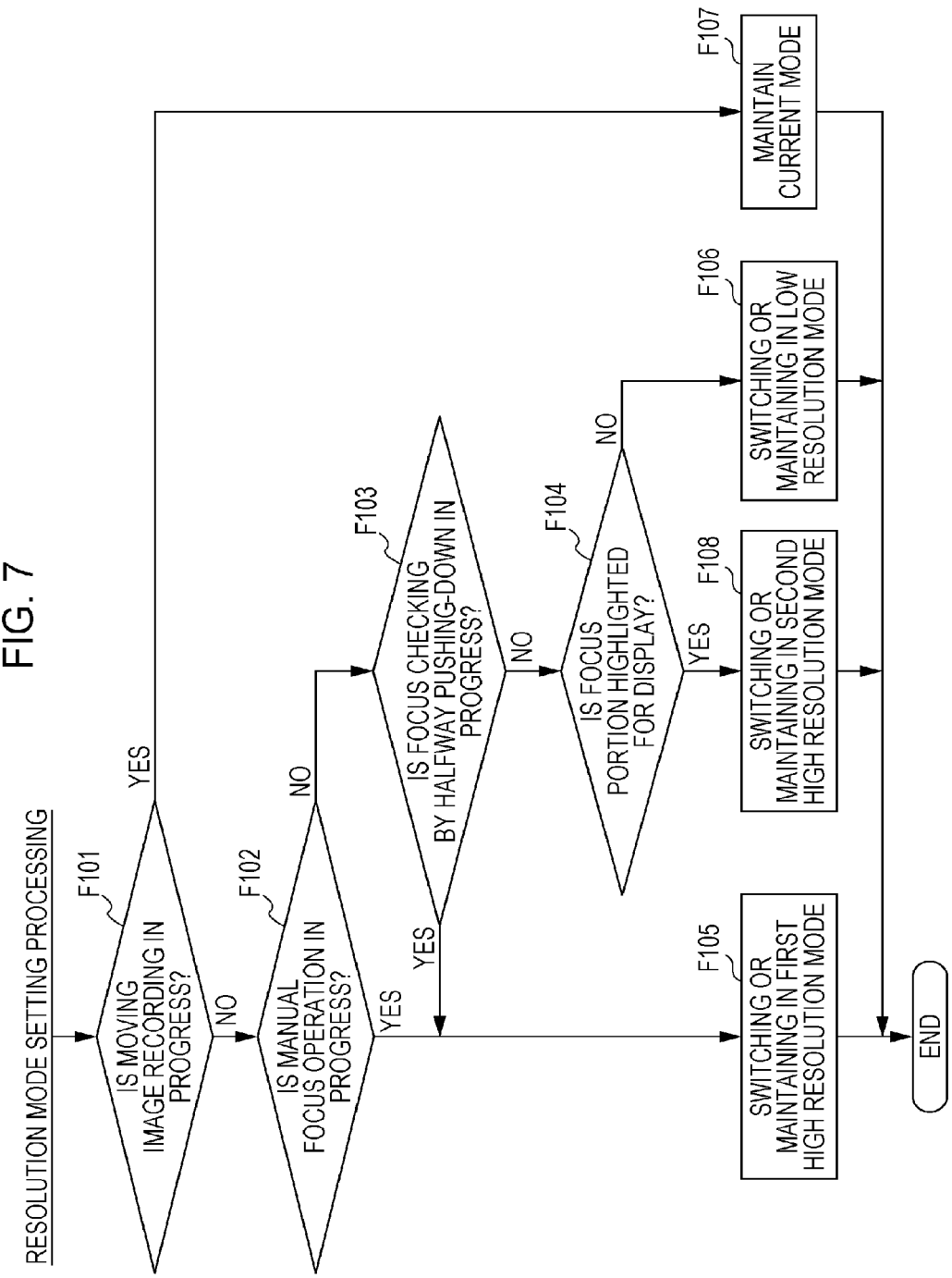
FIG. 7 is a flowchart of resolution mode setting processing according to a second embodiment.

3. Processing Relating to the Resolution Mode According to Second Embodiment FIG. 7 illustrates resolution mode setting processing according to a second embodiment. Additionally, the same processing as in FIG. 5 is given the same step number and a description thereof is omitted.

A processing example in FIG. 7 can be applied to a case where the switching can be made between first and second high resolution modes and the low resolution mode in the imager 12. For example, the spacing thinning rate is set to ⅑ in the low resolution mode, the spacing thinning rate is set to ⅐ in the second high resolution mode, and the spacing thinning rate is set to ⅕ in the first high resolution mode.

If the manual focus operation is in progress or if the focus checking by the halfway pushing-down is in progress, as the processing in FIG. 7, the control unit 30 controls the imager 12 in such a manner that the imager 12 is switched to the first high resolution mode (F102→F105 or F103→F105).

Furthermore, if the highlighting of the focus portion is in progress, the control unit 30 controls the imager 12 in such a manner that the imager 12 is switched to the second high resolution mode (F104→F108).

In other cases, the imager 12 is set to be in the low resolution mode (F106).

Like in the example, the resolution mode may be switched in three stages. For example, when the focus operation is in progress, the visual recognizability for the user takes priority and thus the image quality is set to the highest priority. On the other hand, because the user can easily recognize the focus portion because of the highlighting when the highlighting is in progress, the image quality may be somewhat lowered. However, when the spacing thinning rate is increased too much, the high frequency component is insufficient and thus it is not possible to properly execute the processing for the highlighting. Accordingly, the setting to the second high resolution mode that is somewhat lower in image quality than the first high resolution mode is performed and thus the effect of reducing power consumption is also somewhat obtained.

For example, by switching the resolution mode for the imager 12 in three stages or in multiple stages according to the operation status, the processing that uses the capture image data with the resolution that is according to each operation state can be executed.

In this case, of course, the quality of the moving image data that is recorded can be maintained by not performing the change of the resolution mode when the moving image recording is in progress (F107).

4. Program

The imaging apparatus 10 according to the embodiments is described above, but the processing for the resolution mode switching for the imager 12 described above may be executed in hardware and may be executed in software.

If an arithmetic processing unit is caused to execute the processing in software, for example, a smart phone, a tablet terminal, a portable telephone, and a device that has various imaging functions other than functions of these can be set to be a device equivalent to the imaging apparatus 10 described above according to the embodiments.

The program according to the embodiment causes, for example, the arithmetic processing unit, such as a central processing unit (CPU), or a digital signal processor (DSP), to execute the processing described above according to the embodiment.

That is, the program according to the embodiment causes the arithmetic processing unit to execute the processing that detects the operation state of the imaging apparatus 10 including the imager 12 (the photoelectric conversion unit) which outputs the capture image signal as the electrical signal in response to receiving light from the photographic subject and in which for the outputting of the capture image signal, the multiple resolution modes differing in resolution are switchable while maintaining the viewing angle as in the capture image, and the display data generation unit 26 that generates the display data that is used in the monitoring display of the imaged photographic subject, based on the capture image that is output from the imager 12, the processing that executes the capture image signal output from the imager 12 in the low resolution mode, and the control processing that switches the capture image signal output from the imager 12 in the high resolution mode, if the operation state relating to the focusing is detected by the processing that detects the operation state of the imaging apparatus 10 when the capture image signal output from the imager 12 is executed in the low resolution mode.

Specifically, the program according to the embodiment may be a program that causes the arithmetic processing unit to execute the processing in FIG. 5 or FIG. 7.

The program can be recorded in advance in a HDD, as a recording medium built into such an apparatus as a computer, a ROM within a microcomputer having a CPU or the like.

Alternatively, furthermore, the program can be stored (recorded) temporarily or permanently in a removable recoding medium, such as a flexible disk, a compact disc read only memory (CD-ROM), a magnet optical (MO) disc, a digital versatile disc (DVD), a Blu-ray disc (a registered trademark), a magnetic disk, a semiconductor memory, or a memory card. The removable recording medium can be provided as so-called packaged software.

Furthermore, the program can be installed on a personal computer and the like from the removable recording medium and can also be downloaded from a download site over a network, such as a local area network (LAN) or the Internet.

Furthermore, the program is suitable in providing the imaging apparatus 10 in a wide range according to the embodiments. For example, the program can be downloaded onto a device, such as a personal computer, a portable information processing device, a portable telephone, a game machine, a video device, a personal digital assistant (PDA), that has the imaging function (the optical system 11 or the imager 12, the digital signal processing unit 20, and the like), and thus the corresponding personal computer and the like can be set to be the imaging apparatus according to the present technology.

5. Modification Examples

The embodiments are described above, but according to the present technology, various modification examples are considered.

The example in which the display unit 34 as the imaging apparatus 10 is provided is described, but in the present technology, an external display device that is separate from the imaging apparatus 10 may be used for the display of the monitoring image. Therefore, the present technology can be applied even though the image device 10 does not have the display unit 34.

According to the embodiment, the switching of the resolution mode is not performed when the moving image recording is in progress, but even though one region of a group of the photoelectric conversion pixels in the imager 12 is read without the spacing thinning (at the time of the enlargement focus processing), it is appropriate that the switching of the resolution mode is not performed.

Furthermore, according to the embodiments described above, the frame of the still image recording is not described, but in practice, if the shutter button is pushed down all the way (a release operation) to be recorded or if the capture image data for a certain frame is encoded as the still image data to be recorded, the imager 12 may perform the capture image data output in the resolution mode that is set for recording the still image, with respect to the frame.

It is considered that highlighting of the focus portion is not used in the resolution mode switching. For example, if it is desired that a period of time for low power consumption is extended as long as possible, the setting to the high resolution mode may be performed only when the manual focus operation is in progress or only when the auto focus operation is in progress. In this case, the switching between the high resolution mode and the low resolution mode occurs when the highlighting is in progress. Accordingly, in this case, the control unit 30 may perform parameter switching for the highlighting, in association with the resolution mode switching. For example, when a frequency component rate changes in the low resolution mode and the high resolution mode, it is not possible to perform in the same manner the selection of the focus portion to be highlighted.

Accordingly, for example, a parameter for a cut-off frequency of a high pass filter is changed and it is appropriate that processing is performed such as the changing of a threshold of the selection of the focus portion.

Additionally, the present technology can employ the following configurations.

(1) An image processing system, comprising: circuitry configured to determine whether a focus operation is performed on an image, process the image in a high resolution mode when the focus operation is determined to be performed, and process the image in a low resolution mode when the focus operation is determined not to be performed, wherein a resolution of the image is lower in the low resolution mode than in the high resolution mode.

(2) The image processing system of (1), wherein the circuitry is further configured to switch from the high resolution mode to the low resolution mode after the focus operation is completed.

(3) The image processing system of (1), wherein the circuitry is further configured to drive an optical system through which the image is received during the focus operation.

(4) The image processing system of (1), wherein the circuitry is further configured to delay switching between the high resolution mode and the low resolution mode until after image recording on a computer-readable medium is complete.

(5) The image processing system of (1), wherein the circuitry is configured to highlight a focus target within the image when processing the image in the high resolution mode during the focus operation.

(6) The image processing system of any one of (1) to (5), wherein the circuitry is further configured to highlight the focus target by changing at least one of a luminance value and color information for corresponding pixels.

(7) The image processing system of any one of (1) to (6), wherein the circuitry highlights the focus target after the focus target is identified during the focus operation.

(8) The image processing system of any one of (1) to (7), wherein the focus target is identified using facial recognition to recognize a face in the image.

(9) The image processing system of any one of (1) to (8), wherein highlighting of the focus target is user-selectable.

(10) The image processing system of any one of (1) to (3), wherein the circuitry is configured to determine whether the focus operation is performed based on a depression state of a shutter button.

(11) The image processing system of any one of (1) to (10), wherein the circuitry determines that the focus operation is performed when the shutter button is depressed to a midpoint between fully depressed and not depressed.

(12) The image processing system of any one of (1) to (11) according to claim 11, wherein the circuitry is configured to switch from the high resolution mode to the low resolution mode when the shutter button is released.

(13) The image processing system of any one of (1) to (12), wherein when the circuitry switches from the high resolution mode to the low resolution mode, the circuitry adjusts development parameters accordingly.

(14) The image processing system of any one of (1) to (13), wherein the development parameters include a flicker width, a size and an effective range of the image.

(15) The image processing system of any one of (1) to (14), wherein the circuitry is configured to switch between the high resolution mode and the low resolution mode while maintaining a same viewing angle.

(16) The image processing system of any one of (1) to (5), wherein the circuitry is further configured to switch between first and second high resolution modes based on whether the focus target is highlighted.

(17) The image processing system of any one of (1) to (5) and (16), wherein the circuitry uses the first high resolution mode when the focus target is not highlighted and uses the second high resolution mode when the focus target is highlighted.

(18) The image processing system of any one of (1) to (5) and (16) to (17), wherein the first high resolution mode has a higher resolution than the second high resolution mode and both first and second high resolution modes have higher resolution that the low resolution mode.

(19) An image processing method for an image processing system, comprising: determining, in circuitry, whether a focus operation is performed on an image; processing, in the circuitry, the image in a high resolution mode when the focus operation is determined to be performed; and processing, in the circuitry, the image in a low resolution mode when the focus operation is determined not to be performed, wherein a resolution of the image is lower in the low resolution mode than in the high resolution mode.

(20) A non-transitory computer-readable medium encoded with computer-readable instructions thereon that, when executed by a computer, cause the computer to perform a method comprising: determining whether a focus operation is performed on an image; processing the image in a high resolution mode when the focus operation is determined to be performed; and processing the image in a low resolution mode when the focus operation is determined not to be performed, wherein a resolution of the image is lower in the low resolution mode than in the high resolution mode.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing system, comprising:
   circuitry configured to
      determine whether a manual focus operation is performed by a user on an image,
      display, on a display, the image in a first resolution when the manual focus operation is determined not to be performed,
      process the image in a second resolution, which is greater than the first resolution, to obtain edge information in the image when the manual focus operation is determined to be performed; and
      display, on the display, the image together with the edge information highlighted when the manual focus operation is determined to be performed, wherein
      when the circuitry switches from processing the image in the second resolution to processing the image in the first resolution mode, the circuitry adjusts at least one of a flicker width, a size and an effective range of the image.

2. The image processing system according to claim 1, wherein the circuitry is configured to switch from displaying the image in the second resolution to the first resolution after the manual focus operation is completed.

3. The image processing system according to claim 1, wherein the circuitry is configured to drive an optical system through which the image is received during the manual focus operation.

4. The image processing system according to claim 3, wherein the circuitry is configured to determine whether the manual focus operation is performed by the user based on a depression state of a shutter button.

5. The image processing system according to claim 4, wherein the circuitry determines that the manual focus operation is performed when the shutter button is depressed to a midpoint between fully depressed and not depressed.

6. The image processing system according to claim 5, wherein the circuitry is configured to switch from processing the image in the second resolution to processing the image in the first resolution when the shutter button is released.

7. The image processing system according to claim 1, wherein the circuitry is configured to delay switching between displaying the image in the second resolution and the first resolution until after image recording on a computer-readable medium is complete.

8. The image processing system according to claim 1, wherein the circuitry is configured to highlight the edge information by changing at least one of a luminance value and color information of corresponding pixels.

9. The image processing system according to claim 1, wherein the circuitry is configured to:
   identify a focus target in the image during the manual focus operation;
   obtain, as the edge information, edge information of the focus target; and
   display, on the display, the image together with the edge information of the focus target highlighted after the focus target is identified during the focus operation.

10. The image processing system according to claim 9, wherein the focus target is identified using facial recognition to recognize a face in the image.

11. The image processing system according to claim 9, wherein the focus target s user-selectable.

12. The image processing system according to claim 1, wherein when the circuitry switches from processing the image in the second resolution to processing the image in the first resolution, the circuitry adjusts development parameters accordingly.

13. The image processing system according to claim 12, wherein the development parameters include a flicker width, a size and an effective range of the image.

14. The image processing system according to claim 1, wherein the circuitry is configured to switch between processing the image in the second resolution and the first resolution while maintaining a same viewing angle.

15. The image processing system according to claim 1, wherein the circuitry is further configured to switch between from processing the image in first and second resolutions based on whether the edge information has been obtained.

16. The image processing system according to claim 15, wherein the circuitry processes the image in the first resolution when the edge information is not being obtained and processes the image in the second resolution when obtaining the edge information in the image.

17. An image processing method for an image processing system, comprising:
   determining, by circuitry, whether a manual focus operation is performed by a user on an image;
   displaying, by a display, the image in a first resolution when the manual focus operation is determined not to be performed;
   processing, by the circuitry, the image in a second resolution, which is greater than the first resolution, to obtain edge information in the image when the manual focus operation is determined to be performed; and displaying, by the display, the image together with the edge information highlighted when the manual focus operation is determined to be performed, wherein wherein when processing the image in the second resolution is switched to processing the image in the first resolution mode, the circuitry adjusts at least one of a flicker width, a size and an effective range of the image.

18. A camera comprising:

a display; and circuitry configured to
- determine whether a manual focus operation is performed by a user on an image;
- display, on the display, the image in a first resolution when it is determined that the manual focus operation is not being performed;
- process the image in a second resolution, which is greater than the first resolution, to obtain edge information of an in-focus subject in the image when it is determined that the manual focus operation is being performed; and
- display, on the display, the image together with the edge information highlighted when it is determined that the manual focus operation is being performed, wherein
- when the circuitry switches from processing the image in the second resolution to processing the image in the first resolution mode, the circuitry adjusts at least one of a flicker width, a size and an effective range of the image.

* * * * *